US008472946B2

(12) United States Patent  
Chan et al.

(10) Patent No.: US 8,472,946 B2  
(45) Date of Patent: Jun. 25, 2013

(54) OPEN TO ALL PREPAID ROAMING SYSTEMS AND METHODS

(75) Inventors: Siu Bun Chan, Kowloontong (CN); Hong Bin Liang, Nanshan (CN); Xin Yu Yan, Nanshan (CN)

(73) Assignee: Altobridge Limited (IE)

( * ) Notice: Subject to any disclaimer, the term of this patent is extended or adjusted under 35 U.S.C. 154(b) by 697 days.

(21) Appl. No.: 12/199,335

(22) Filed: Aug. 27, 2008

(65) Prior Publication Data

US 2010/0056102 A1 Mar. 4, 2010

(51) Int. Cl.
*H04W 4/00* (2009.01)

(52) U.S. Cl.
USPC ......... 455/432.1; 455/551; 455/560; 455/406

(58) Field of Classification Search
USPC ............... 455/432.1–433, 551, 560, 406–408
See application file for complete search history.

(56) References Cited

U.S. PATENT DOCUMENTS

| 6,029,062 | A | 2/2000 | Hanson |
| 6,226,364 | B1 | 5/2001 | O'Neil |
| 6,324,394 | B1 | 11/2001 | Vazvan |
| 6,603,968 | B2 * | 8/2003 | Anvekar et al. ............... 455/433 |
| 6,684,072 | B1 | 1/2004 | Anvekar et al. |
| 6,792,271 | B1 | 9/2004 | Sherman et al. |
| 6,907,242 | B2 | 6/2005 | Thakker |
| 7,324,816 | B2 | 1/2008 | Sherman et al. |
| 2002/0058494 | A1 | 5/2002 | Timonen et al. |
| 2005/0192035 | A1 * | 9/2005 | Jiang ............................. 455/461 |
| 2007/0259663 | A1 | 11/2007 | Weintraub et al. |
| 2008/0102829 | A1 * | 5/2008 | Jiang ............................. 455/433 |
| 2008/0182553 | A1 * | 7/2008 | Salkini et al. ................. 455/408 |
| 2010/0144344 | A1 * | 6/2010 | Jiang ............................. 455/433 |

OTHER PUBLICATIONS

Printout from "http://www.coffeetelecom.com", accessed Aug. 26, 2008.

* cited by examiner

*Primary Examiner* — Vladimir Magloire

(74) *Attorney, Agent, or Firm* — Bryan Cave LLP

(57) ABSTRACT

Some embodiments include a method for providing roaming service for a wireless device of a person that is both a prepaid subscriber of a local network and a subscriber of a home network with which the local network has a roaming agreement. Other embodiments of related systems and methods are also disclosed.

30 Claims, 8 Drawing Sheets

OPEN TO ALL PREPAID ROAMING SYSTEMS AND METHODS

BACKGROUND

It is typically the case that in order for a subscriber of a first, "home" public land mobile network (PLMN) to use services provided by a second, "visited" PLMN, the operators of the two PLMNs must have entered into a "roaming agreement." The negotiation and execution of a roaming agreement between the operators of the two PLMNs is typically a complex and time consuming process. However, some operators may not have the resources to enter into roaming agreements with other operators or such other operators may not be willing to enter into roaming agreements with some operators. Both cases may occur, for example, with operators of so-called micro Global System for Mobile communication (GSM) networks.

Moreover, an operator that is a party to a roaming agreement typically must devote resources to implement and support the technical and administrative requirements called for by such roaming agreements. Some operators may not wish to devote resources to implementing and supporting such roaming agreements.

SUMMARY

In one embodiment, a method for providing roaming service comprises receiving an identifier from a wireless device located within a coverage area of a local network, wherein the identifier is associated with the wireless device. The method further comprises determining if the wireless device is associated with a person that is both a prepaid subscriber of the local network and a subscriber of a home network with which the local network has a roaming arrangement. The method further comprises, if the wireless device is associated with a person that is both a prepaid subscriber of the local network and a subscriber of a home network with which the local network has a roaming arrangement, doing the following: (i) performing a first location update to the home network for the wireless device so that the wireless device can receive calls directed to a home phone number associated with the home network; (ii) performing a second location update to a local home location register (HLR) for the wireless device so that the wireless device can receive calls directed a local phone number associated with the local network; and (iii) while the wireless device remains in the coverage area of the local network, providing service to the wireless device in connection with the local phone number using a prepaid billing plan associated with the local phone number and providing service to the wireless device in connection with the home phone number in accordance with the roaming agreement the local network has with the home network.

The details of various embodiments of the claimed invention are set forth in the accompanying drawings and the description below. Other features and advantages will become apparent from the description, the drawings, and the claims.

DRAWINGS

Like reference numbers and designations in the various drawings indicate like elements.

DETAILED DESCRIPTION

Figure 1:
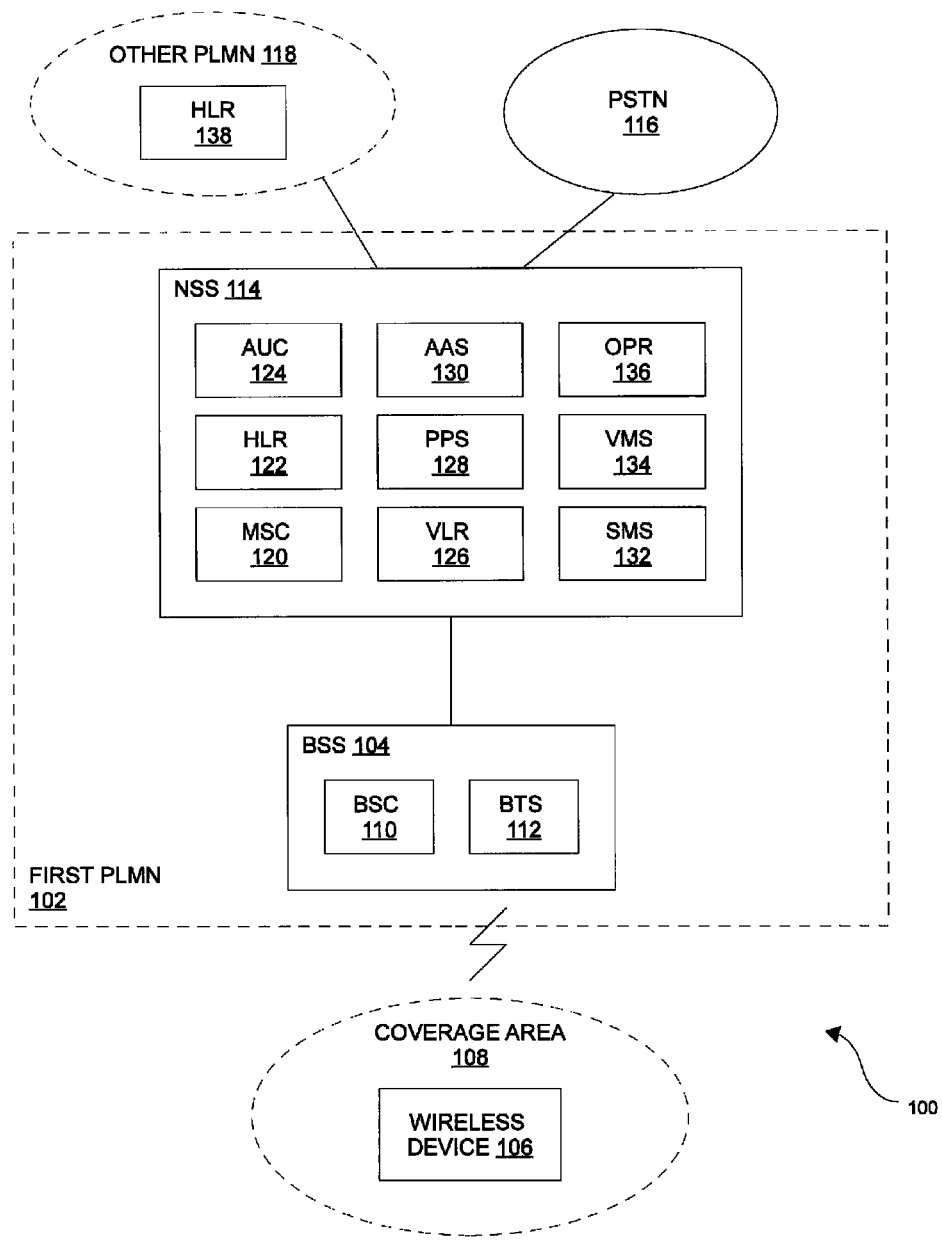
FIG. 1 is a block diagram of one embodiment of a wireless communication system.

FIG. 1 is a block diagram of one embodiment of a wireless communication system 100 suitable for implementing the technology described below. The communication system 100 is a part of a public land mobile network (PLMN) 102. The public land mobile network 102 is also referred to here as the "first" public land mobile network 102 or, in some contexts, the "local" or "visited" public land mobile network 102. The wireless communication system 100 is described here as being implemented in order to support one or more of the Global System for Mobile communication (GSM) family of telephony and data specifications and standards. It is to be understood, however, that other embodiments are implemented to support other wireless specifications or standards including, for example, one or more of the CDMA family of telephony and data standards (including, for example, the IS-95, CDMA2000, and EV-DO standards).

The first PLMN 102 comprises a base station subsystem 104. The base station subsystem 104 implements at least one air interface that enables it to communicate with at least one wireless device 106 located within a coverage area 108 associated with the base station subsystem 104. In the particular embodiment shown in FIG. 1, the wireless device 106 is a GSM mobile station (such as a mobile telephone or a personal digital assistant) that is able to at least make and receive telephone calls. In this embodiment, the BSS 104 supports at least one GSM telephony air interface that enables the BSS 104 (and the other elements of the first PLMN 102) to communicate with a wireless device 106 that is able to make and receive telephone calls.

The BSS 104 comprises base station controller (BSC) functionality 110 and base transceiver station (BTS) functionality 112. In the particular embodiment shown in FIG. 1, the BSC functionality 110 implements GSM base station controller functions including, for example, base station management (including radio channel allocation, call handovers among base stations, and base transceiver station configuration), software and alarm handling, and operations and maintenance support. Moreover, in some embodiments, the BSC functionality 110 includes or is communicatively coupled to an appropriate network element or function (for example, a packet control unit (PCU)) for directing traffic to and from a data network (for example, the Internet or another data network that is coupled to the Internet).

The particular embodiment shown in FIG. 1 supports at least one GSM air telephony interface. The BTS functionality 112 implements GSM base station functionality including, for example, one or more radio transceiver (TRXs), power amplifiers, combiners, duplexers, and antennas (and/or suitable interfaces to connect the BTS functionality 112 to one or more antennas). In some embodiments, the base station subsystem 104 further includes transcoding functionality. In other embodiments, transcoding occurs elsewhere in the PLMN 102.

In some embodiments, the BSC functionality 110 and the BTS functionality 112 are implemented in separate devices that communicate with one another using the GSM Abis interface over suitable communication links. In some implementations of such embodiments, the communication links comprise one or more time division multiplexing (TDM) communication links such as E1 or T1 communication links or a wide or local area network such as an Internet Protocol (IP) network. In other embodiments, at least a part of the BSC functionality 110 is implemented in the same device in which the BTS functionality 112 is implemented.

Although only a single BSS 104 and a single coverage area 108 are shown in FIG. 1, it is to be understood that the first PLMN 102 can include any number of base station subsystems 104 and each base station subsystem 104 can include multiple coverage areas.

The first PLMN 102 also comprises a network switching subsystem (NSS) 114. The NSS 114 is communicatively coupled to the base station subsystem 104. For example, in some embodiments, the NSS 114 is communicatively coupled to the base station subsystem 104 via one or more time division multiplexing (TDM) communication links such as E1 or T1 links. In other embodiments, the NSS 114 is communicatively coupled to the base station subsystem 104 via a wide or local area network such as an IP network. In other embodiments, the NSS 114 is communicatively coupled to the BSS 104 in other ways (for example, using wireless links such as satellite or microwave links or by integrating the NSS 114 (or portions thereof) and BSS 104 (or portions thereof) into the same device).

The NSS 114 is also communicatively coupled to a public switched telephone network (PSTN) 116 (for example, for voice communications) and to other public land mobile networks 118. For ease of explanation, only one PSTN 116 and one other PLMN 118 are shown in FIG. 1; however, it is to be understood that the NSS 114 will typically be communicatively coupled to more than one other PLMNs 118. The other PLMN 118 shown in FIG. 1 is also referred to here as the "second" PLMN 118 or, in some contexts, the "home" PLMN 118.

The NSS 114 implements circuit switching functionality, authorizes subscribers, obtains and maintains subscriber information, and provides applications and call features to subscribers of the first PLMN 102 (such as call ringing, roaming, voice mail, short message service). In the particular embodiment shown in FIG. 1, the NSS 114 implements GSM network switching subsystem functionality. For example, in the embodiment shown in FIG. 1, the NSS 114 comprises a mobile switching center (MSC) 120 to implement GSM MSC functionality. For example, the MSC 120 performs call processing and switching and mobility and handover handling. The MSC 120 communicates with each BSS 104 using the GSM A interface.

In the embodiment shown in FIG. 1, the NSS 114 comprises a home location register (HLR) 122 for the first PLMN 104 that implements GSM home location register functionality. The HLR 122 comprises a data store in which information about each subscriber of the first PLMN 104 is stored. Typically, there is one logical HLR per PLMN, although the HLR is typically implemented using multiple physical HLRs.

In the embodiment shown in FIG. 1, the NSS 114 also comprises an authentication center (AUC) 124 that implements GSM authentication functionality. The AUC 124 is used to authorize subscribers of the first PLMN 104. In some embodiments, the AUC 124 is integrated with the HLR 122.

In the embodiment shown in FIG. 1, the NSS 114 also comprises a visitor location register (VLR) 126 that implements GSM visitor location register functionality. Each separate coverage area 108 that is supported by the first PLMN 104 has one VLR with which it is associated. The VLR 126 comprises a data store in which information about each subscriber who is currently in a coverage area 108 that is associated with the VLR 126 is stored. Such subscribers include subscribers who are subscribers of the first PLMN 104 (and who, therefore, have their subscriber information stored in the HLR 116) and subscribers who are not subscribers of the first PLMN 104.

In the embodiment shown in FIG. 1, the NSS 114 also comprises a prepaid server (PPS) 128 to implement standard GSM prepaid functionality in addition to the open-to-all prepaid roaming functionality described below. The PPS 128 includes or is coupled to a data store to store prepaid-related information.

The NSS 114 also includes other typical value added services functionality such an audio announcement server (AAS) 130 to provide call and prepaid voice announcements to users of the PLMN 102, a short message service (SMS) server 132 to implement GSM short message service functionality, and a voice mail server (VMS) 134 to provide voice mail services to subscribers of the first PLMN 102.

The first PLMN 102 implements special roaming functionality that enables a subscriber of another PLMN 118 to register with and use services provided by the first PLMN 102 as a special type of prepaid user having a special type of prepaid account. This type of service is also referred to here as "open-to-all prepaid roaming" (OPR). This type of roaming is referred to as "open-to-all" because this type of roaming enables any user to use services provided by the first (visited) PLMN 102 regardless of whether the operator of the user's home PLMN 118 has a roaming agreement in place with the operator of the visited PLMN 102 and without having to acquire and use a local subscriber identity module (SIM) from the visited PLMN 102. This type of roaming is referred to as "prepaid" because the user must pay for the services to be used before they are used (for example, by purchasing a calling card or by using a credit card).

In the particular embodiment shown in FIG. 1, the NSS 114 includes an open-to-all prepaid roaming (OPR) agent 136 to coordinate the various OPR-related functions that are carried out by the VLR 126, HLR 122, and PPS 128 and to maintain an OPR account in an associated OPR data store. In one implementation of such an embodiment, the OPR-related functionality is implemented using GSM Customized Applications for Mobile Network Enhanced Logic (CAMEL). In such an implementation, the OPR agent 136 is a service control point for the OPR functionality.

The OPR account that is created and maintained by the OPR agent 136 includes, for each OPR subscriber, the subscriber's International Mobile Subscriber Identity (IMSI) number provided by the subscriber's home PLMN 118 (which is stored in a SIM module used in that subscriber's wireless device 106), an International Mobile Equipment Identity (IMEI) number associated with the wireless device 106 used by the OPR subscriber, a local phone number (Mobile Station International ISDN Number (MSISDN)) assigned by the local PLMN 102, and a status of the OPR account (described in more detail below). In this embodiment, the OPR agent 136 uses the IMSI and the IMEI as the identification key for each OPR subscriber. As a result, in this embodiment, an OPR subscriber must use the same SIM module and wireless device 106 that was used when the OPR account for that subscriber was created. Also, if a visitor registers as an OPR subscriber using the manual registration method described below in connection with FIG. 4 (for example, if the subscriber is a visitor whose home PLMN 118 has a roaming agreement with the local PLMN 102), then the OPR agent 136 will not have collected the visitor's IMSI at the time the OPR account was created for that visitor. The IMSI for that OPR subscriber is collected when the OPR subscriber registers to the PLMN 102 (that is, when the VLR 126 performs a location update for the subscriber).

It is noted that, in the following description, reference is made to "registering" a visitor as an OPR subscriber of the local PLMN 102 and "registering" a visitor with a VLR, HLR, or PLMN. These refer to different processes. The former refers to a process by which a visitor to the local PLMN 102 initially becomes an OPR subscriber of the local PLMN 102. The latter refers to the standard process by which a subscriber "registers" with a VLR and/or HLR of a PLMN by performing a location update.

The VLR 126 is modified to register visitors as OPR subscribers and to perform location updates for OPR subscribers (in addition to performing standard VLR processing). More specifically, the data that is maintained by the VLR 126 for each subscriber that is located with a respective coverage area 108 is modified to add a flag to indicate whether that particular subscriber is an OPR subscriber. In one implementation of such an embodiment that is implemented using GSM CAMEL, the VLR 126 serves as a detection point for the OPR service and the subscriber record for each OPR subscriber includes CAMEL Subscription Information (CSI) that is used to identify the associated subscriber as an OPR subscriber and the addresses of other entities that provide OPR-related services (that is, the OPR agent 136 and the PPS 128). The call data records that the VLR 126 generates for OPR subscribers also include a flag that indicates that the associated subscriber is an OPR subscriber.

The VLR 126 is also modified to support multiple subscriber profiles (GSM Multiple Subscriber Profile (MSP) functionality in this particular embodiment) for those OPR subscribers whose home PLMNs have a roaming agreement in place with the local PLMN 102. This is done to enable such an OPR subscriber to use, in parallel, both the local MSISDN assigned by the local PLMN 102 and the home MSISDN assigned by the OPR subscriber's home PLMN 118.

Figure 2:
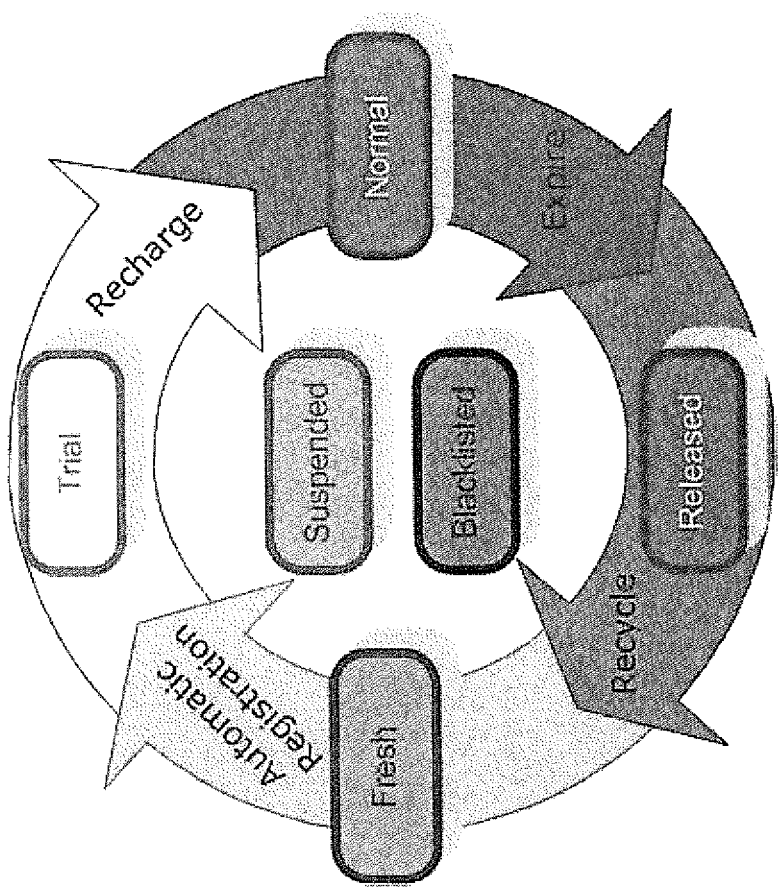
FIG. 2 is diagram illustrating the modification to the standard prepaid account lifecycle.

The PPS 128 is modified to register visitors as OPR subscribers, to manage the life cycle of prepaid accounts for OPR subscribers, and to send welcome messages to newly registered OPR subscribers (in addition to performing standard PPS processing). In this embodiment, the prepaid account established by the PPS 128 for OPR subscribers is the standard prepaid account that is created for all prepaid subscribers of the local PLMN 102 with the addition of a new status in the standard prepaid account life cycle. FIG. 2 is diagram illustrating the modification to the standard prepaid account lifecycle. In this embodiment, each prepaid account includes the following standard prepaid statuses: Fresh (idle), Normal (active), Released (expired), Suspended (temporarily disabled), and Blacklist (disabled because, for example, too many false recharges) and the following new, OPR-specific status: Trial. The Trial status is the status the prepaid account has after a subscriber has automatically registered but before the subscriber charges the account. The operator of the local PLMN 102 may decide to provide restricted service (defined by the operator) to the subscriber while the OPR account of the subscriber is in the Trial status. The life span of the Trial status is typically short (for example, one day), and the OPR account dies (that is, is deleted) if the subscriber does not recharge within the life span of the Trial status. The OPR account transitions from the Trial status to the Normal status if the subscriber recharges the OPR prepaid account within the life span of the Trial status. In one implementation of such an embodiment, the way that an operator defines restricted (or different) service for OPR subscribers in the Trial status is to define a particular class of service (COS) for such OPR subscribers.

In this embodiment, the PPS 128 is also enables an OPR subscriber to make OPR prepaid account inquiries in order to check the balance of his or her OPR prepaid account and to recharge the OPR prepaid account. In general, in such an embodiment, the standard prepaid functionality can be used to implement such features. In addition, the standard prepaid management tools can be used to monitor and manage OPR subscribers.

The call data records that the PPS 128 generates for OPR subscribers also include a flag that indicates that the associated subscriber is an OPR subscriber.

The HLR 122 is modified to support the registration of OPR subscribers as described below. The OPR subscriber data stored by the HLR 122 is the same data stored for other local subscribers of the local PLMN 102.

Otherwise, the other functions of the first PLMN 102 operate in a conventional manner. However, an OPR subscriber may need to modify certain settings in his or her wireless device 106 in order to use some services provided by the local PLMN 102 in the same manner the OPR subscriber would use similar services provided by his or her home PLMN 118. For example, in order to use SMS service, an OPR subscriber may need to change the Message Center Number (MCN) to the MCN for the local PLMN 102. This information can be provided to the user in the greeting message that is sent to the OPR subscriber upon registering as an OPR subscriber.

The OPR functionality described here in connection with the local PLMN 102 enables a visitor to the local PLMN 102 to use the local PLMN 102 even if the visitor's home PLMN 118 does not have a roaming agreement with the local PLMN 102 and without requiring the visitor to change the SIM module in the wireless device 106. The OPR functionality enables a visitor to be automatically registered as an OPR subscriber of the local PLMN 102 if the visitor's home PLMN 118 does not have a roaming agreement in place with the local PLMN 102. Absent such OPR functionality, the visitor would not be able to use the local PLMN 102. However, if the visitor's home network does have a roaming agreement in place with the local PLMN 102, the visitor is already able to use the local PLMN 102 in accordance with the roaming agreement that is in place. Such a visitor, however, can use the manual registration process described below in connection with FIG. 4 in order to use the local PLMN 102 as an OPR subscriber. Examples of why such a user might wish to use the local PLMN 102 as an OPR subscriber include because doing so may be less expensive than using the local PLMN 102 as a conventional roaming user and/or because the visitor may wish to cap the costs associated with using the local PLMN 102 (which are capped at the balance in the visitor's prepaid account).

As described below, the OPR agent 136 automatically allocates a local phone number (that is, a local MSISDN) for each OPR subscriber. The OPR subscriber can receive calls that are made to the local MSISDN, which are billed in accordance with the OPR prepaid billing plan. The OPR functionality described here enables those OPR subscribers whose home networks have roaming agreements in place with the local PLMN 102 to use both the local MSISDN that is automatically assigned by the OPR agent 136 and the subscriber's home MSISDN assigned by the subscriber's home PLMN 118.

FIGS. 3A-3D are flow diagrams of one exemplary method 300 of providing open-to-all prepaid roaming in the system 100 of FIG. 1. Although the embodiment of method 300 is described here as being implemented in a GSM network (and in the particular embodiment of a GSM network shown in FIG. 1), it is to be understood that other embodiments are implemented in other ways (for example, in wireless communication networks that support other wireless specifications or standards including, for example, one or more of the CDMA family of telephony and data standards (including, for example, the IS-95, CDMA2000, and EV-DO standards).

When a wireless device 106 enters a coverage area 108 associated with the local PLMN 102 (checked in block 302), the local VLR 126 determines if the user of the wireless device 106 is a local subscriber of the local PLMN 102 (block 304). As used here, a "local subscriber" is a user whose home PLMN is the local PLMN 102. In this particular embodiment, which supports one or more of the GSM family of standards, the VLR 126 receives an identifier that identifies a subscriber associated with the wireless device 106 and an identifier that identifies the wireless device 106. The identifier that identifies a subscriber associated with the wireless device 106 is the IMSI number, which is stored in a SIM module used in the wireless device 106. The identifier that identifies the wireless device 106 is an IMEI number, which is associated with the wireless device 106. In such an embodiment, the VLR 126 determines if the user of the wireless device 106 is a local subscriber of the local PLMN 102 by checking the IMSI prefix of the IMSI number received from the wireless device 106 to identify the home PLMN for the subscriber associated with that IMSI. If the IMSI prefix of the received IMSI is not the IMSI prefix for the local PLMN 102, then the user of the wireless device 106 is not a local subscriber of the local PLMN 102 and, instead, the VLR 126 considers the user to be a "visitor" of the local PLMN 102.

If the user of the wireless device 106 is a local subscriber of the local PLMN 102, the VLR 126 (and the rest of the PLMN 102) provides wireless service in a conventional manner to the local subscriber in accordance with that local subscriber's local subscription (block 306). Such service is provided to the wireless device 106 using the phone number (that is, the Mobile Station International ISDN Number (MSISDN)) assigned to that wireless device 106 by the local PLMN 102.

If the user of the wireless device 106 is not a local subscriber of the local PLMN 102, then the VLR 126 provides the received IMSI and IMEI for the visitor and the wireless device 106 to the OPR agent 136 (block 308). The OPR agent 136 uses the IMEI to check if the visitor is an "OPR" subscriber for the local PLMN 102 (block 310). As described below, the OPR agent 136 stores information about each OPR subscriber of the local PLMN 102.

If the visitor is not an OPR subscriber, the OPR agent 136 checks if the local PLMN 102 has a roaming agreement with the home PLMN 118 of the visitor (block 312). If there is such a roaming agreement in place, the local PLMN 102 provides wireless service to the visitor in accordance with that roaming agreement (block 314). That is, wireless service is provided to the visitor in a conventional manner using the home MSISDN for that visitor. As described below, in this embodiment, where the home PLMN 118 of a visitor has a roaming agreement in place with the local PLMN 102, the visitor is unable to automatically register as an OPR subscriber and, instead, must use the manual registration method described below in connection with FIG. 4 if the visitor wishes to register as an OPR subscriber of the local PLMN 102.

Figure 3A:
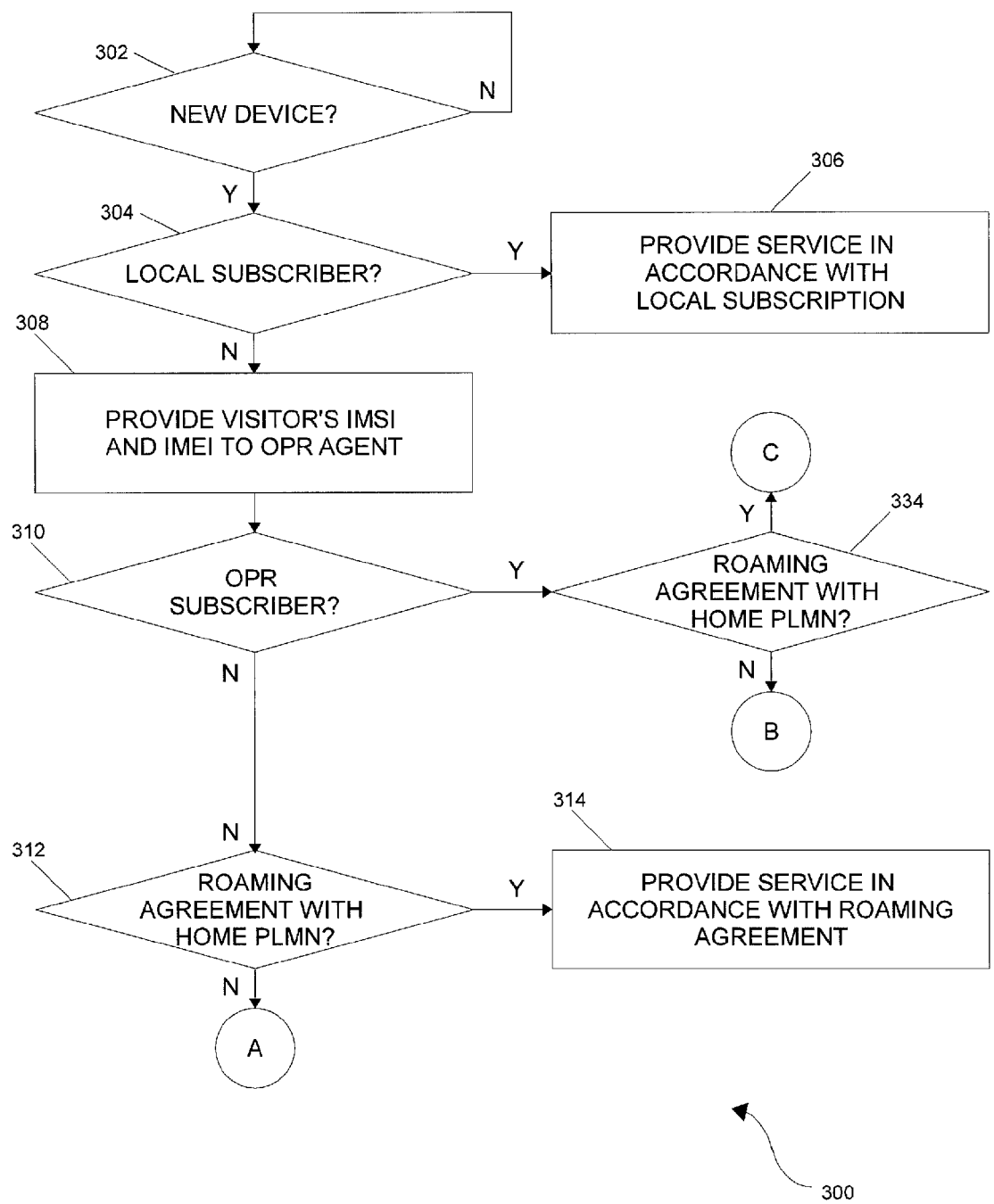
FIGS. 3A-3D are flow diagrams of one exemplary method of providing open-to-all prepaid roaming in the system of FIG. 1.
Figure 3B:
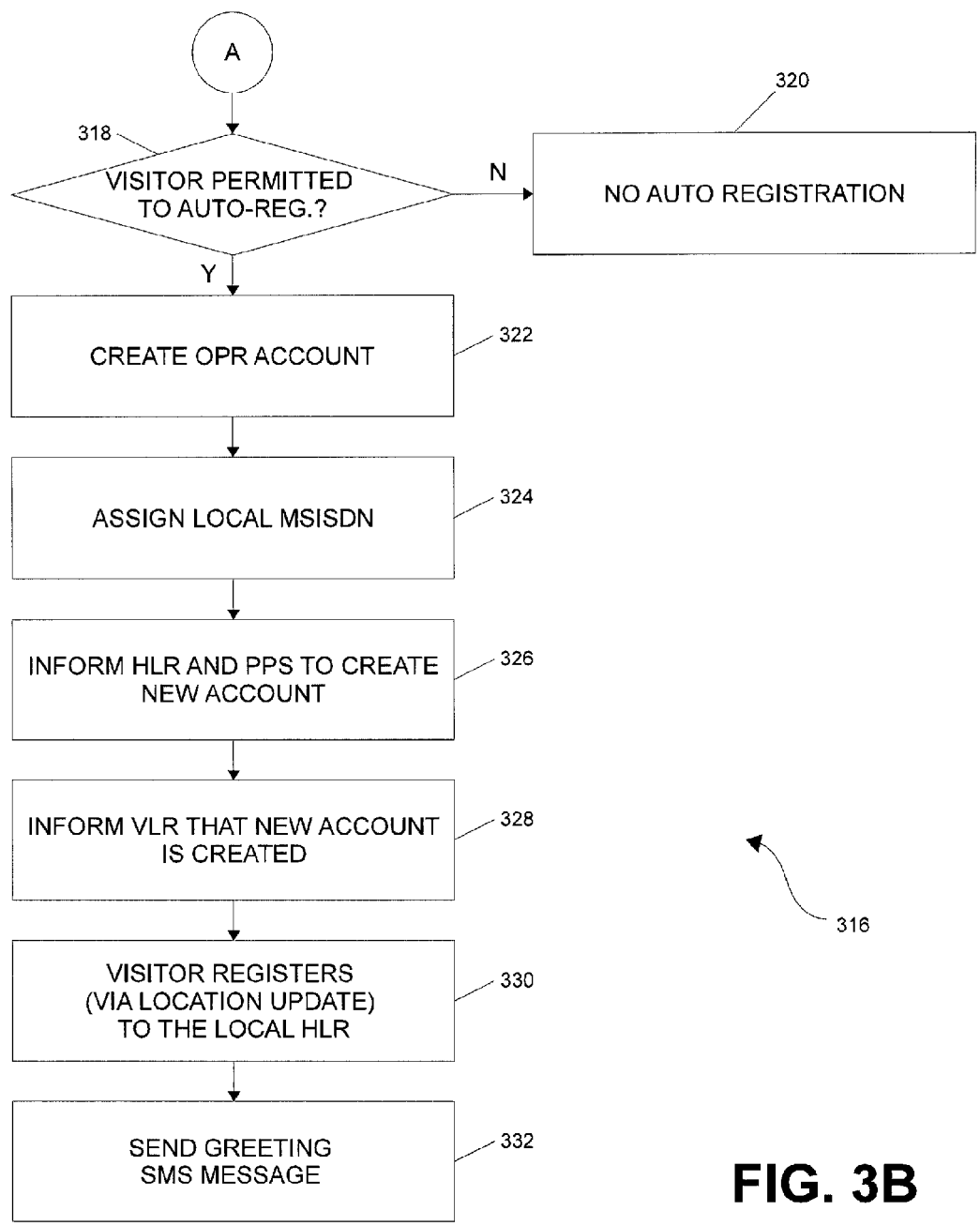

If the visitor is not an OPR subscriber and the local PLMN 102 does not have a roaming agreement with the home PLMN 118 of that visitor, then the automatic registration method 316 shown in FIG. 3B is performed. The automatic registration method 316 automatically registers the visitor as an OPR subscriber of the local PLMN 102. However, as noted below, wireless service is not provided (or only restricted service is provided) to the visitor until the visitor "charges" his or her OPR account.

As shown in FIG. 3B, the automatic registration method 316 comprises checking if that visitor is permitted to automatically register as an OPR subscriber with the local PLMN 102 (block 318). In this embodiment, this check is performed by the OPR agent 136 and is done by comparing the IMSI-prefix (or the entire IMSI) of the visitor to a list of IMSI-prefixes (or entire IMSI numbers). In one implementation, the list can contain a list of IMSI-prefixes and/or entire IMSI numbers that are not permitted to automatically register as OPR subscribers (also referred to as "inhibition mode") or can contain a list of IMSI-prefixes and/or entire IMSI numbers that are permitted to automatically register as OPR subscribers (also referred to as "prohibition mode"). For example, the list can include IMSI-prefixes that correspond to particular countries (3-digit Mobile Country Code (MCC)) or that correspond to particular networks (3-digit MCC plus 3-digit mobile network code (MNC)) and/or entire IMSI numbers that correspond to particular subscribers or groups of subscribers. In inhibition mode, the list contains countries, networks, and/or subscribes that are prohibited from automatically registering and any IMSI that is on the list (or that has an IMSI-prefix that is on the list) is prohibited from automatically registering. This mode may be useful for public networks that are operated by public network operators. In permission mode, the list contains countries, networks, and/or subscribes that are permitted to automatically register and any IMSI that is on the list (or that has an IMSI-prefix that is on the list) is permitted to automatically register. This mode may be useful for private networks that are operated, for example, by or on behalf of companies or other entities.

If the visitor is not permitted to automatically register as an OPR subscriber, then that the OPR agent 136 does not automatically register the visitor as an OPR subscriber (block 320).

If the visitor is permitted to automatically register as an OPR subscriber, then the OPR agent 136 creates an OPR account for that visitor (block 322) and assigns a local phone number (that is, a local MSISDN) to that visitor and wireless device 106 (block 324). The OPR account established (and thereafter maintained) by the OPR agent 136 includes, for example, the IMSI associated with the visitor, the IMEI of the wireless device 106, the local MSISDN assigned to that visitor and wireless device 106, and an OPR status for the OPR account. Then, the OPR agent 136 causes the HLR 122 and the PPS 128 to create a new HLR account and pre-paid account, respectively, for the visitor (block 326). Creating the HLR account with the HLR 122 of the local PLMN 102 enables the HLR 122 to act as the HLR for the visitor and wireless device 106 when using the local MSISDN. The HLR account, in this embodiment, is the standard HLR account that is created for all subscribers of the local PLMN 102.

After the various accounts have been created for the visitor, the OPR agent 136 informs the VLR 126 that the accounts have been created for the visitor (who is an OPR subscriber at that point) (block 328) and the VLR 126 registers the visitor with the local HLR 122 (block 330). The VLR 126 registers the visitor with the local HLR 122 by performing a location update for that visitor. The OPR agent 136 then causes a short message service (SMS) greeting message to be sent to the wireless device 106 (block 332). The greeting message includes, for example, text welcoming the visitor to the local PLMN 102 and includes the local MSISDN and the password that have been assigned to that visitor and wireless device 106. The greeting message can also include information about how to recharge the visitor's OPR prepaid account.

As noted above, the visitor will need to recharge the OPR account that was created by the automatic registration method 216 in order for the OPR account to transition to the Normal status and enable the subscriber to use the wireless services provided by the local PLMN 102 in connection with the local MSISDN (or use more than any restricted service provided while the visitor's OPR prepaid account is in the Trial status).

As shown in FIG. 3A, after an OPR account has been created for the visitor and the wireless device 106 and after the visitor has recharged the account (such that the status of the visitor's OPR prepaid account is Normal), when the wireless device 106 enters the coverage area 108 associated with the local PLMN 102 (block 302) and the local VLR 126 determines that the user of the wireless device 106 is not a local subscriber of the local PLMN 102 (block 304), the VLR 126 provides the IMSI and IMEI for the user and wireless device 106 to the OPR agent 136 (block 308) and the OPR agent 136 determines that the visitor is an OPR subscriber (block 310). Then, the OPR agent 136 checks if the local PLMN 102 has a roaming agreement with the home PLMN 118 for that subscriber (block 334).

Figure 3C:
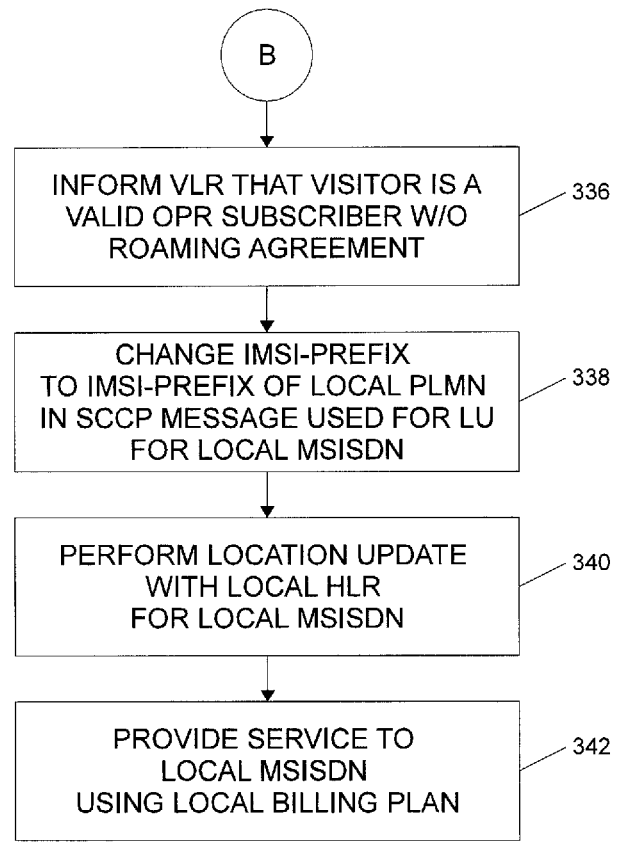

As shown in FIG. 3C, if the visitor is an OPR subscriber of the local PLMN 102 and the local PLMN 102 does not have a roaming agreement with the home PLMN 118 of that visitor, the OPR agent 136 informs the VLR 126 that the visitor is a valid OPR subscriber without a roaming agreement (block 336). The VLR 126 then registers the OPR subscriber with the local HLR 122 by performing a location update (block 340). The VLR 126 changes the IMSI-prefix of the OPR subscriber to the IMSI-prefix of the local PLMN 102 in the Signaling Connection Control Part (SCCP) message to redirect or route the location update to the local HLR 122 (block 338). It is to be understood that the IMSI-prefix in the MAP message and in the HLR database is not changed to the IMSI-prefix of the local PLMN 102. The local HLR 122 considers the local PLMN 102 to be the "home PLMN" for the OPR subscriber for the purposes of providing OPR service to the subscriber in connection with the local MSISDN assigned to that subscriber. Then, the VLR 126 (and the rest of the local PLMN 102) provides wireless service to the local MSISDN using the local billing plan (block 342). That is, the local PLMN 102 provides service to the subscriber using the local MSISDN and the OPR prepaid billing plan described above.

Figure 3D:
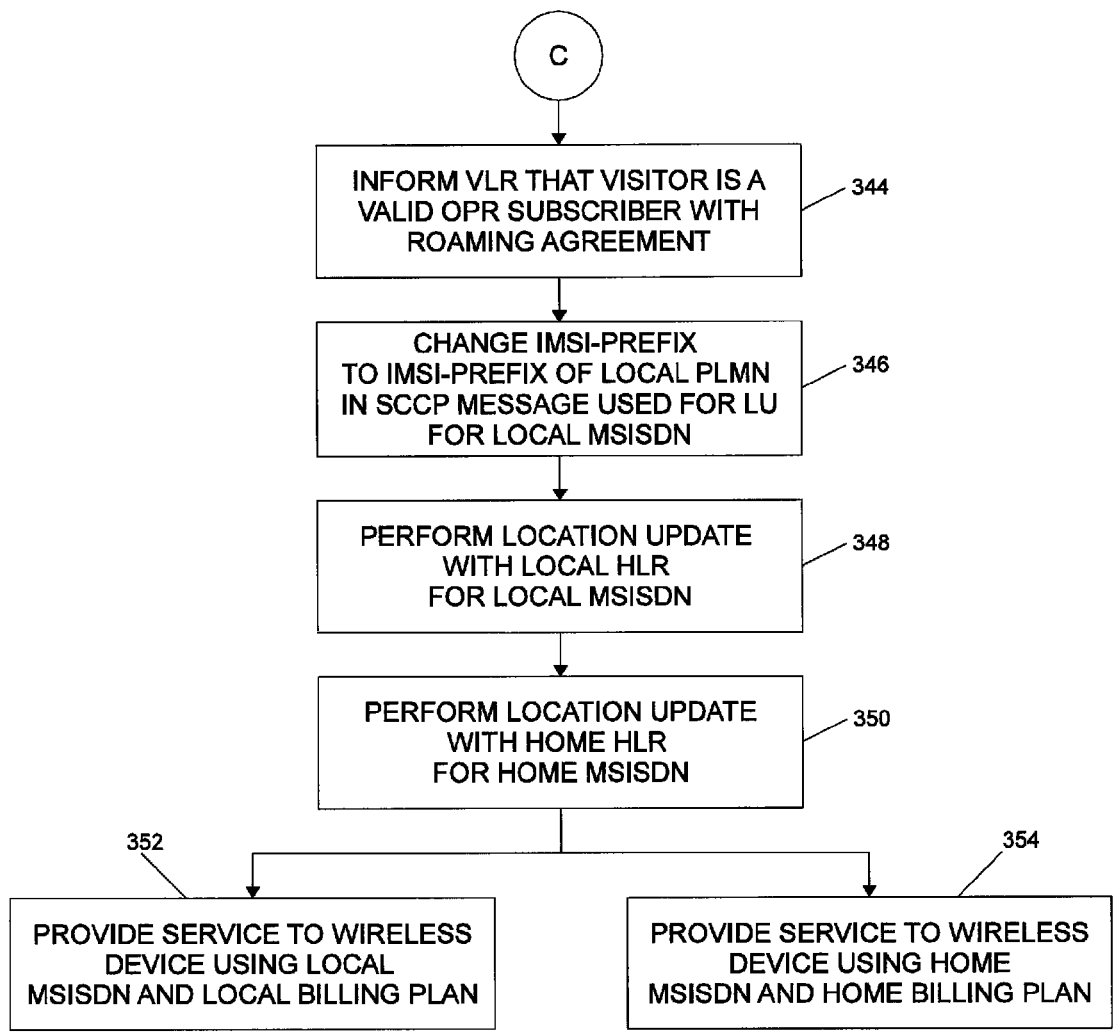

As shown in FIG. 3D, if the visitor is an OPR subscriber of the local PLMN 102 and the local PLMN 102 has a roaming agreement with the home PLMN 118 of that visitor, the OPR agent 136 informs the VLR 126 that the visitor is a valid OPR subscriber with a roaming agreement (block 344). The VLR 126 then registers the OPR subscriber with the local HLR 122 by performing a location update (block 348). The VLR 126 changes the IMSI-prefix of the OPR subscriber to the IMSI-prefix of the local PLMN 102 in the SCCP message to redirect or route the location update to the local HLR 122 (block 346). It is to be understood that the IMSI-prefix in the MAP message and in the HLR database is not changed to the IMSI-prefix of the local PLMN 102. The local HLR 122 considers the local PLMN 102 to be the "home PLMN" for the OPR subscriber for the purposes of providing OPR service to the subscriber in connection with the local MSISDN assigned to that subscriber. Since this OPR subscriber is from PLMN 118 that has roaming agreement with local PLMN 102, the VLR also registers the OPR subscriber with the home HLR 138 (block 350). The VLR 126 registers the OPR subscriber with the home HLR 138 by performing a normal location update. As a result, the "home PLMN" for the OPR subscriber's home MSISDN number is the home PLMN 118 and the "home PLMN" for the OPR subscriber's local MSISDN number is the local PLMN 102.

The VLR 126 (and the rest of the local PLMN 102) provides wireless service to the visitor's wireless device 106 using the visitor's local MSISDN and the local OPR billing plan (block 352), and, in parallel, provides wireless service to the visitor's wireless device 106 in connection with the visitor's home MSISDN in accordance with the roaming agreement (block 354). In this way, while the visitor is within a coverage area 108 of the local PLMN 102, the visitor is able to make and receive calls using the local MSISDN and be billed in accordance with the OPR prepaid plan while still being able to receive calls made to the visitor's home MSISDN.

Figure 4:
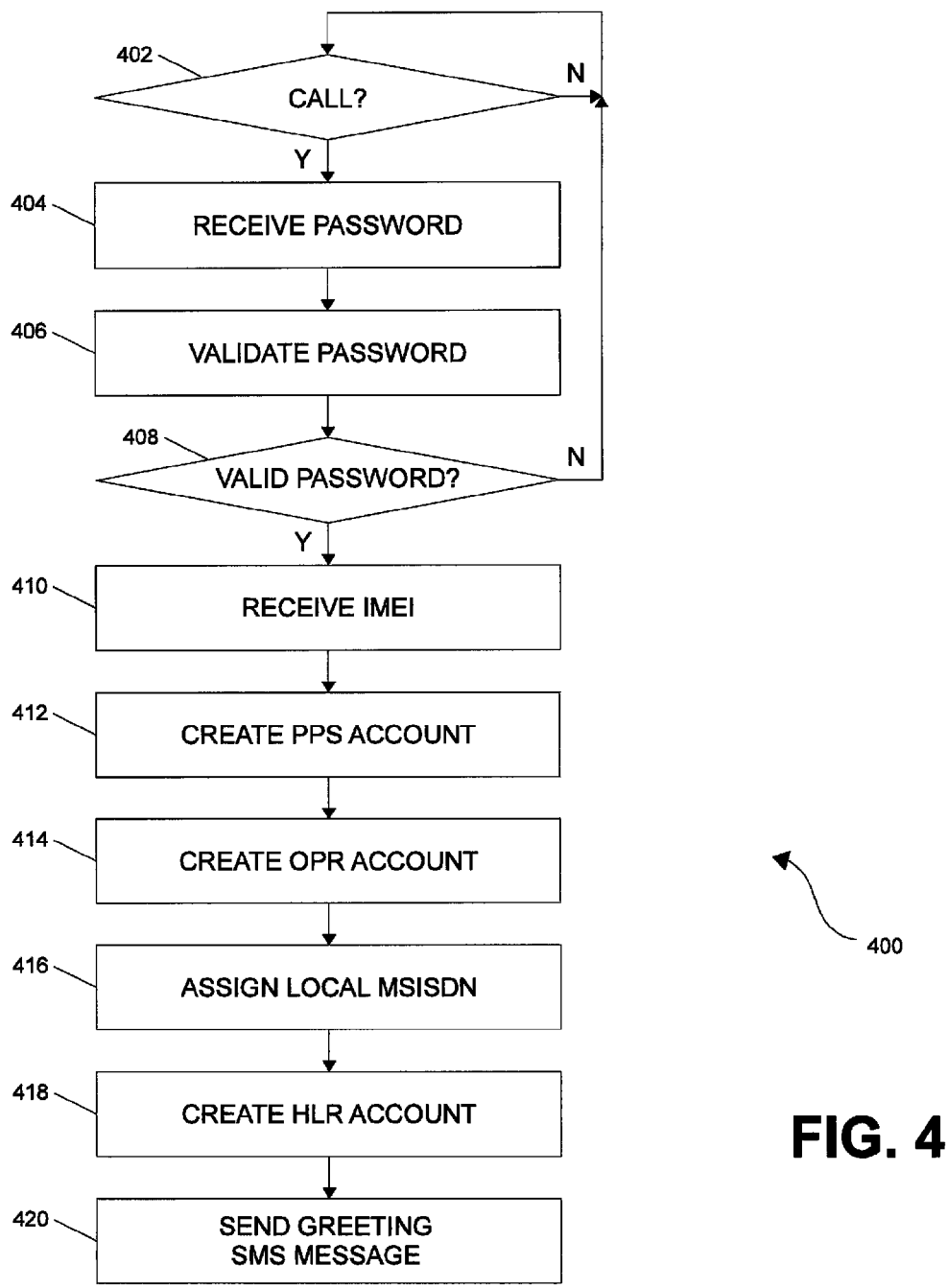
FIG. 4 is a flow diagram of one exemplary method of manually registering a visitor as an open-to-all prepaid roaming subscriber in the system of FIG. 1.

FIG. 4 is a flow diagram of one exemplary method 400 of manually registering a visitor as an open-to-all prepaid roaming subscriber in the system 100 of FIG. 1. Although the embodiment of method 400 is described here as being implemented in a GSM network (and in the particular embodiment of a GSM network shown in FIG. 1), it is to be understood that other embodiments are implemented in other ways (for example, in wireless communication networks that support other wireless specifications or standards including, for example, one or more of the CDMA family of telephony and data standards (including, for example, the IS-95, CDMA2000, and EV-DO standards).

As noted above in connection with block 312 of FIG. 3A, in this particular embodiment, the manual registration method 400 must be used to register those visitors whose home PLMN 118 has a roaming agreement in place with the local PLMN 102. Visitors whose home PLMN 118 does not have a roaming agreement in place with the local PLMN 102 may either use the auto-registration method 316 described above when they first enter a wireless coverage area 108 of the local PLMN 102 or use the manual registration method 400 prior to entering a wireless coverage area 108 of the local PLMN 102.

In order to manually register as an OPR subscriber, a visitor first must purchase a pre-paid calling card that is authorized by the local PLMN 102. The pre-paid calling card has a password printed on it (using an appropriate security measure to prevent the password from being used without purchasing the calling card). After such purchase, the visitor can then manually register as an OPR subscriber by calling a telephone number associated with the audio announcement server 130. When the visitor calls the number associated with the AAS 130 (checked in block 402), the AAS 130 prompts the caller to enter the password from the pre-paid calling card and then receives a password entered by the visitor using the telephone's key pad (block 404). The AAS 130 then forwards the entered password to the prepaid server 128 and the prepaid server 128 checks if the entered password is valid (block 406). In the particular embodiment shown in FIG. 4, if the entered password is not valid (block 408), method 400 is terminated for that call. In some other embodiments, if the entered password is not valid, the AAS 130 informs the caller of that fact and gives the caller the option to enter another password, which is then validated. The caller may be permitted to re-enter the password a pre-determined number of times before the call is dropped and method 400 is terminated.

If the entered password is valid, the AAS 130 is informed of that fact and prompts the caller to enter the IMEI of the wireless device 106 that the caller wishes to register with the local PLMN 102. The AAS 130 then receives an IMEI that is entered by the caller using the telephone keypad (block 410). The AAS 130 forwards the IMEI to the PPS 128, which creates an OPR prepaid account for the caller (block 412). When the PPS 128 creates the OPR prepaid account for the caller, the balance of the OPR prepaid account is set to the dollar amount associated with the calling card and the status of the OPR prepaid account is the Normal status.

Then, the PPS 128 causes the OPR agent 136 to create the OPR account for the caller (block 414) and to assign a local phone number (that is, a local MSISDN) to the OPR subscriber and wireless device 106 (block 416). Then, the OPR agent 136 causes the HLR 122 to create a new HLR account for the caller (block 418). Creating the HLR account with the HLR 122 of the local PLMN 102 enables the HLR 122 to act as the HLR for the subscriber and wireless device 106 when using the local MSISDN. The HLR account, in this embodiment, is the standard HLR account that is created for all subscribers of the local PLMN 102.

The OPR agent 136 then causes a short message service (SMS) greeting message to be sent to the wireless device 106 (block 420). The greeting message includes, for example, text welcoming the subscriber to the local PLMN 102 and includes the local MSISDN and the password that have been assigned to that subscriber and wireless device 106.

The OPR prepaid account, OPR account, and HLR account are created for the caller using the IMEI that was entered by the caller. However, the IMSI for the caller will not be available until the caller uses the wireless device 106 within a coverage area 108 of the local PLMN 102. When this happens, the OPR agent 136 forwards the IMSI to the PPS 128 and HLR 122 so that the PPS 128 and HLR 122 can store the IMSI in the OPR prepaid account and HLR account.

Figure 5:
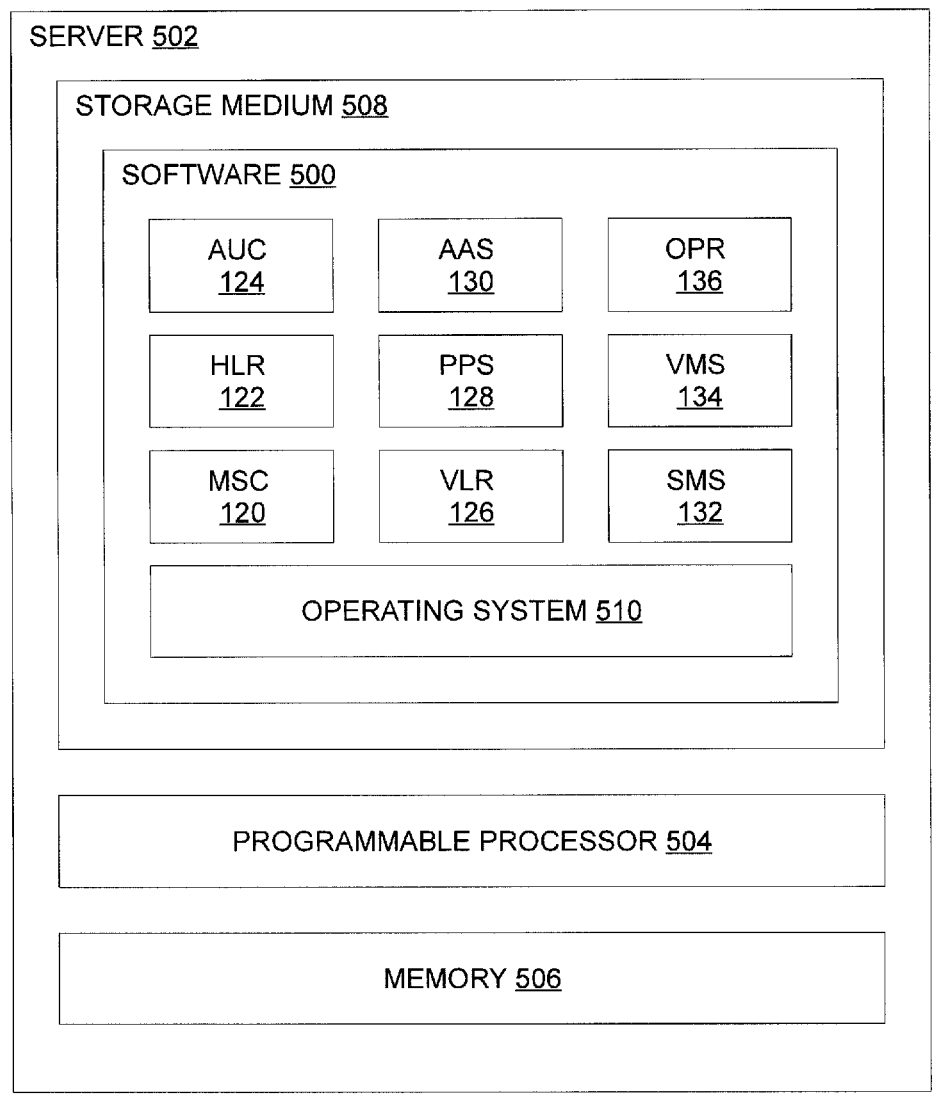
FIG. 5 is a block diagram of one exemplary implementation of the functionality described herein.

The functionality described above can be implemented in various ways. FIG. 5 is a block diagram of an exemplary implementation of such functionality. In the exemplary implementation shown in FIG. 5, the NSS 114 functionality described above is implemented as software 500 that executes on a server 502. The server 502 comprises one or more programmable processors 504 for executing the software 500 and memory 506 for storing the program instructions and any related data. The software 500 comprises program instructions that are stored (or otherwise embodied) on an appropriate storage medium or media 508 (such as flash memory) from which at least a portion of the program instructions are read by the programmable processor 504 for execution thereby.

The server 502 includes appropriate interface 510 to communicatively couple the server 502 to other elements of the PLMN 102 (for example, one or more BSSs 104 (if the BSS functionality is not implemented in the server 502)), the PSTN 116, and/or the other PLMN 118.

The software 500 implements the functionality for one or more of the MSC 120, HLR 122, AUC 124, VLR 126, PPS 128, AAS 130, SMS 132, VMS 134, and the OPR agent 136. In the particular embodiment shown in FIG. 5, the software 500 also comprises an operating system 512 that controls the execution of the rest of the software 500.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor, also known as processor-readable medium. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Other processor-readable medium or storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A method for providing roaming service, the method comprising:
    receiving an identifier from a wireless device when the wireless device enters a coverage area of a local network, wherein the identifier is associated with the wireless device;
    determining if the wireless device is associated with a person that is both a prepaid subscriber of the local network and a subscriber of a home network with which the local network has a roaming arrangement; and
    if the wireless device is associated with the person that is both the prepaid subscriber of the local network and the subscriber of the home network with which the local network has the roaming arrangement:
        performing a first location update to the home network for the wireless device so that the wireless device can receive calls initiated by dialing a home phone number associated with the home network;
        performing a second location update to a local home location register (HLR) of the local network for the wireless device so that the wireless device can receive calls initiated by dialing a local phone number associated with the local network; and
        while the wireless device remains in the coverage area of the local network:
            when the wireless device receives calls initiated by dialing the local phone number associated with the local network, providing service to the wireless device according to a prepaid billing plan; and
            when the wireless device receives calls initiated by dialing the home phone number associated with the home network, providing the service to the wireless device according to the roaming arrangement.

2. The method of claim 1, wherein performing the second location update to the local HLR for the wireless device comprises changing at least a portion of a subscriber identifier used in a message for performing the second location update to refer to the local network.

3. The method of claim 2, wherein the at least the portion of the subscriber identifier comprises an International Mobile Subscriber Identity (IMSI) prefix and the message comprises a Signaling Connection Control Part (SCCP) message, wherein changing the IMSI prefix in the SCCP message causes the SCCP message to be routed to the local HLR instead of a home HLR of the home network with which the local network has the roaming arrangement.

4. The method of claim 1, wherein the method is performed in a GSM network, wherein the local network comprises a first public land mobile network (PLMN) and the home network comprises a second PLMN, the identifier associated with the wireless device comprises an international mobile equipment identifier (IMEI) assigned to the wireless device, wherein the first PLMN comprises the local HLR, wherein the second PLMN comprises a home HLR of the home network with which the local network has the roaming arrangement, wherein the first PLMN includes a prepaid server (PPS) for use in connection with providing the service to the wireless device according to the prepaid billing plan.

5. The method of claim 1, further comprising registering the person as the prepaid subscriber of the local network by:
receiving an international mobile equipment identity (IMEI) for the wireless device;
creating a prepaid roaming account for the person in at least one of the local HLR or a prepaid server (PPS) of the local network;
assigning the local phone number to the wireless device;
updating the prepaid roaming account for the person with the local phone number; and
sending a welcome message to the wireless device including at least one of the local phone number or information about the prepaid roaming account.

6. The method of claim 5, further comprising recharging the prepaid roaming account for the wireless device by:
receiving a password for a prepaid card;
validating the password with the prepaid server of the local network; and
if the password is valid, updating a balance for the prepaid roaming account for the person with an amount associated with the prepaid card.

7. The method of claim 5, wherein registering the person as the prepaid subscriber of the local network further comprises:
receiving a call initiated by calling a registration number associated with prepaid roaming using the local network;
prompting entry of a password for a prepaid card;
receiving the password;
validating the password; and
if the password is valid:
prompting entry of the IMEI for the wireless device; and
updating a balance for the prepaid roaming account for the person with an amount associated with the prepaid card.

8. The method of claim 5, wherein registering the person as the prepaid subscriber of the local network further comprises:
receiving a call at an audio announcement server (AAS);
prompting entry of a password associated with a calling card;
receiving the password at the AAS;
forwarding the password to the PPS;
determining at the PPS if the password is valid;
if the password is valid:
prompting entry of the IMEI for the wireless device;
receiving the IMEI at the AAS;
forwarding the IMEI to the PPS;
communicating the local phone number to the at least one of the local HLR or the PPS; and
updating at the PPS the prepaid roaming account for the person with the local phone number.

9. The method of claim 1, wherein registering the person as the prepaid subscriber of the local network further comprises:
automatically registering the person as the prepaid subscriber of the local network.

10. A program product comprising a non-transitory processor-readable medium on which program instructions are embodied, wherein the program instructions are operable, when executed by at least one programmable processor included in a device, to cause the device to:
receive an identifier from a wireless device when the wireless device enters a coverage area of a local network, wherein the identifier is associated with the wireless device;
determine if the wireless device is associated with a person that is both a prepaid subscriber of the local network and a subscriber of a home network with which the local network has a roaming arrangement; and
if the wireless device is associated with the person that is both the prepaid subscriber of the local network and the subscriber of the home network with which the local network has the roaming arrangement:
perform a first location update to the home network for the wireless device so that the wireless device can receive calls initiated by dialing a home phone number associated with the home network;
perform a second location update to a local home location register (HLR) of the local network for the wireless device so that the wireless device can receive calls initiated by dialing a local phone number associated with the local network; and
while the wireless device remains in the coverage area of the local network:
when the wireless device receives calls initiated by dialing the local phone number associated with the local network, provide service to the wireless device according to a prepaid billing plan; and
when the wireless device receives calls initiated by dialing the home phone number associated with the home network, provide the service to the wireless device according to the roaming arrangement.

11. The program product of claim 10, wherein the second location update to the local HLR for the wireless device is performed by changing at least a portion of a subscriber identifier used in a message for performing the second location update to refer to the local network.

12. The program product of claim 11, wherein the at least the portion of the subscriber identifier comprises an International Mobile Subscriber Identity (IMSI) prefix and the message comprises a Signaling Connection Control Part (SCCP) message, wherein changing the IMSI prefix in the SCCP message causes the SCCP message to be routed to the local HLR instead of a home HLR of the home network with which the local network has the roaming arrangement.

13. The program product of claim 10, wherein the program instructions are further operable, when executed by the at least one programmable processor included in the device, to cause the device to register the person as the prepaid subscriber of the local network by:
receiving an international mobile equipment identity (IMEI) for the wireless device;
creating a prepaid roaming account for the person in at least one of the local HLR or a prepaid server (PPS) of the local network;

assigning the local phone number to the wireless device;
updating the prepaid roaming account for the person with the local phone number; and
sending a welcome message to the wireless device including at least one of the local phone number or information about the prepaid roaming account.

14. The program product of claim 13, wherein the program instructions are further operable, when executed by the at least one programmable processor included in the device, to cause the device to recharge the prepaid roaming account for the wireless device by:
   receiving a password for a prepaid card;
   validating the password with the prepaid server of the local network; and
   if the password is valid, updating a balance for the prepaid roaming account for the person with an amount associated with the prepaid card.

15. The program product of claim 13, wherein the program instructions are further operable, when executed by the at least one programmable processor included in the device, to cause the device to register the person as the prepaid subscriber of the local network by:
   receiving a call initiated by calling a registration number associated with prepaid roaming using the local network;
   prompting entry of a password for a prepaid card;
   receiving the password;
   validating the password; and
   if the password is valid:
      prompting entry of the IMEI for the wireless device; and
      updating a balance for the prepaid roaming account for the person with an amount associated with the prepaid card.

16. The program product of claim 13, wherein the program instructions are further operable, when executed by the at least one programmable processor included in the device, to cause the device to register the person as the prepaid subscriber of the local network by:
   receiving a call at an audio announcement server (AAS);
   prompting entry of a password associated with a calling card;
   receiving the password at the AAS;
   forwarding the password to the PPS;
   determining at the PPS if the password is valid;
   if the password is valid:
      prompting entry of the IMEI for the wireless device;
      receiving the IMEI at the AAS;
      forwarding the IMEI to the PPS;
      communicating the local phone number to the at least one of the local HLR or the PPS; and
      updating at the PPS the prepaid roaming account for the person with the local phone number.

17. The program product of claim 10, wherein the program instructions are further operable, when executed by the at least one programmable processor included in the device, to cause the device to register the person as the prepaid subscriber of the local network by:
   automatically registering the person as the prepaid subscriber of the local network.

18. A system comprising:
   at least one programmable processor, wherein the programmable processor is configured to execute software that is operable to cause the system to:
      receive an identifier from a wireless device when the wireless device enters a coverage area of a local network, wherein the identifier is associated with the wireless device;
      determine if the wireless device is associated with a person that is both a prepaid subscriber of the local network and a subscriber of a home network with which the local network has a roaming arrangement; and
      if the wireless device is associated with the person that is both the prepaid subscriber of the local network and the subscriber of the home network with which the local network has the roaming arrangement:
         perform a first location update to the home network for the wireless device so that the wireless device can receive calls initiated by dialing a home phone number associated with the home network;
         perform a second location update to a local home location register (HLR) of the local network for the wireless device so that the wireless device can receive calls initiated by dialing a local phone number associated with the local network; and
         while the wireless device remains in the coverage area of the local network:
            when the wireless device receives calls initiated by dialing the local phone number associated with the local network, provide service to the wireless device according to a prepaid billing plan; and
            when the wireless device receives calls initiated by dialing the home phone number associated with the home network, provide the service to the wireless device according to the roaming arrangement.

19. The system of claim 18, wherein the second location update to the local HLR for the wireless device is performed by changing at least a portion of a subscriber identifier used in a message for performing the second location update to refer to the local network.

20. The system of claim 19, wherein the at least the portion of the subscriber identifier comprises an International Mobile Subscriber Identity (IMSI) prefix and the message comprises a Signaling Connection Control Part (SCCP) message, wherein changing the IMSI prefix in the SCCP message causes the SCCP message to be routed to the local HLR instead of a home HLR of the home network with which the local network has the roaming arrangement.

21. The system of claim 18, wherein the programmable processor is further configured to execute the software that is operable to cause the system to implement at least a portion of a network switching subsystem for the local network.

22. The system of claim 21, wherein the programmable processor is further configured to execute the software that implements at least one of: the local HLR, a visitor location register (VLR) of the local network, an audio announcement server (AAS) of the local network, or a prepaid server (PPS) of the local network.

23. A system that is a part of a local network, the system comprising:
   a base station subsystem to communicate with a wireless device located within a coverage area associated with the local network; and
   a network switching subsystem communicatively coupled to the base station subsystem, the network switching subsystem comprising a home location register (HLR) of the local network, a visitor location register (VLR) of the local network, and a prepaid server (PPS) of the local network, the network switching subsystem being operable to:

receive an identifier from the wireless device when the wireless device enters the coverage area of the local network, wherein the identifier is associated with the wireless device;

determine if the wireless device is associated with a person that is both a prepaid subscriber of the local network and a subscriber of a home network with which the local network has a roaming arrangement; and if the wireless device is associated with the person that is both the prepaid subscriber of the local network and the subscriber of the home network with which the local network has the roaming arrangement:

perform a first location update to the home network for the wireless device so that the wireless device can receive calls initiated by dialing a home phone number associated with the home network;

perform a second location update to the HLR for the wireless device so that the wireless device can receive calls initiated by dialing a local phone number associated with the local network; and while the wireless device remains in the coverage area of the local network:

when the wireless device receives calls initiated by dialing the local phone number associated with the local network, provide service to the wireless device according to a prepaid billing plan; and when the wireless device receives calls initiated by dialing the home phone number associated with the home network, provide the service to the wireless device according to the roaming arrangement.

24. The system of claim 23, wherein the second location update to the HLR for the wireless device is performed by changing at least a portion of a subscriber identifier used in a message for performing the second location update to refer to the local network.

25. The system of claim 24, wherein the at least the portion of the subscriber identifier comprises an International Mobile Subscriber Identity (IMSI) prefix and the message comprises a Signaling Connection Control Part (SCCP) message, wherein changing the IMSI prefix in the SCCP message causes the SCCP message to be routed to the HLR instead of a home HLR of the home network with which the local network has the roaming arrangement.

26. The system of claim 23, wherein the local network comprises a first public land mobile network (PLMN) and the home network comprises a second PLMN, the identifier associated with the wireless device comprises an international mobile equipment identifier (IMEI) assigned to the wireless device, wherein the first PLMN comprises the HLR of the local network, wherein the second PLMN comprises an HLR of the home network, wherein the first PLMN comprises a prepaid server (PPS) for use in connection with providing the service to the wireless device according to the prepaid billing plan.

27. The program product of claim 23, wherein the network switching subsystem of the local network is further operable to register the person as the prepaid subscriber of the local network by:

receiving an international mobile equipment identity (IMEI) for the wireless device;

creating a prepaid roaming account for the person in at least one of the HLR or a prepaid server (PPS) of the local network;

assigning the local phone number to the wireless device;

updating the prepaid roaming account for the person with the local phone number; and sending a welcome message to the wireless device including at least one of the local phone number or information about the prepaid roaming account.

28. The program product of claim 27, wherein the network switching subsystem of the local network is further operable to recharge the prepaid roaming account for the wireless device by:

receiving a password for a prepaid card;

validating the password with the prepaid server of the local network; and if the password is valid, updating a balance for the prepaid roaming account for the person with an amount associated with the prepaid card.

29. The program product of claim 27, wherein the network switching subsystem of the local network is further operable to register the person as the prepaid subscriber of the local network by:

receiving a call at an audio announcement server (AAS);

prompting entry of a password associated with a calling card;

receiving the password at the AAS;

forwarding the password to the PPS;

determining at the PPS if the password is valid;

if the password is valid:

prompting entry of the IMEI for the wireless device;

receiving the IMEI at the AAS;

forwarding the IMEI to the PPS;

communicating the local phone number to the at least one of the HLR or the PPS; and updating at the PPS the prepaid roaming account for the person with the local phone number.

30. The program product of claim 23, wherein the network switching subsystem of the local network is further operable to register the person as the prepaid subscriber of the local network by:

automatically registering the person as the prepaid subscriber of the local network.

* * * * *